April 12, 1966 H. W. ALBRECHT ET AL 3,246,128
CHART READING DEVICE
Filed Dec. 18, 1962 2 Sheets-Sheet 1
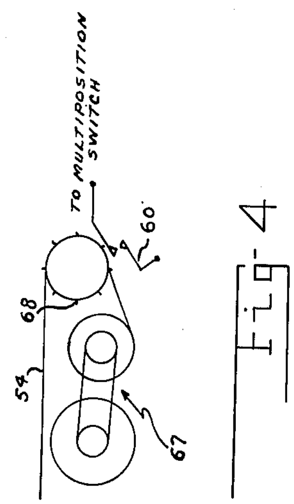
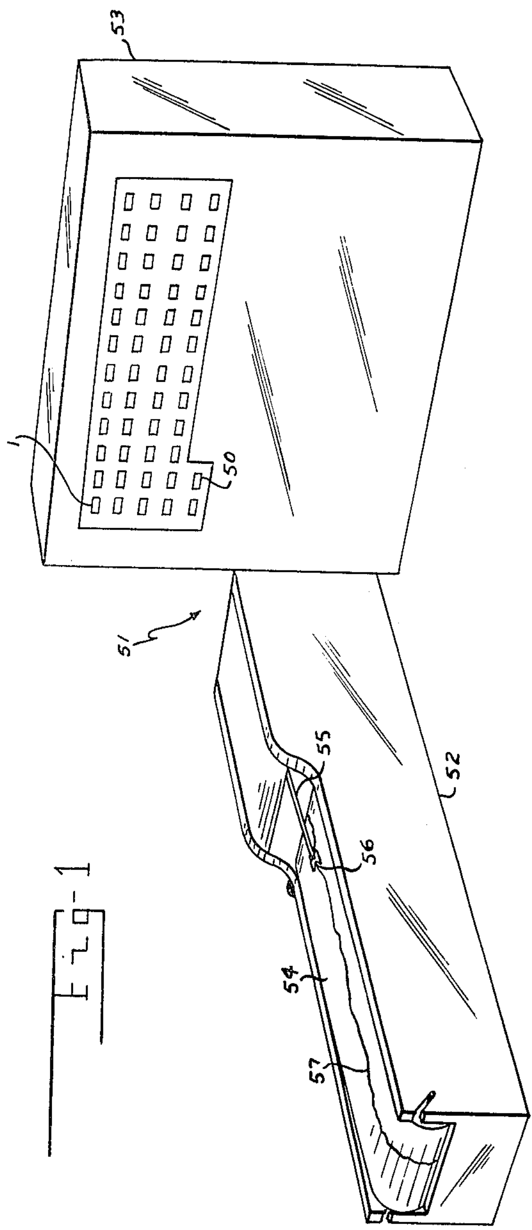
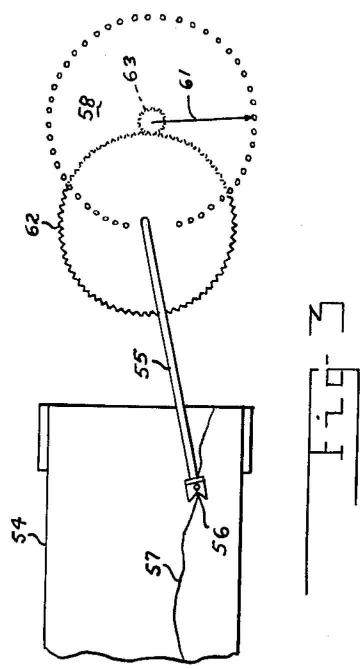
INVENTORS
HAROLD W. ALBRECHT
JOSEPH D. McMILLAN
BY Wade Koontz
ATTORNEY and
Richard J. Killoren
AGENT April 12, 1966 H. W. ALBRECHT ETAL 3,246,128
CHART READING DEVICE
Filed Dec. 18, 1962
2 Sheets-Sheet 2
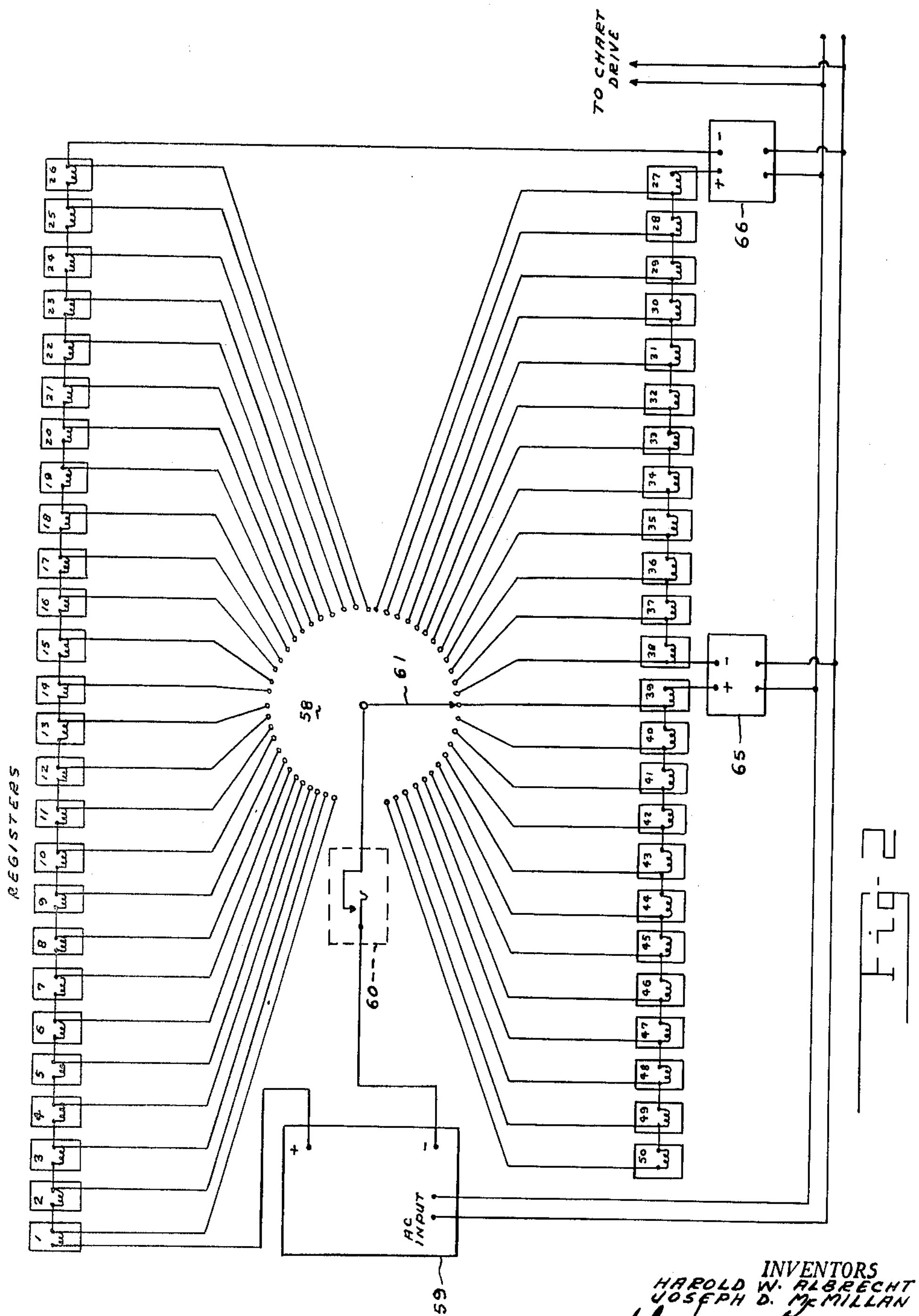
INVENTORS
HAROLD W. ALBRECHT
JOSEPH D. McMILLAN
BY Wade Koontz
ATTORNEY
Richard J. Killoren
AGENT United States Patent Office 3,246,128

Patented Apr. 12, 1966

3,246,128

CHART READING DEVICE

Harold W. Albrecht, Chatham, and Joseph D. McMillan, New Providence, N.J., assignors, by mesne assignments, to the United States of America as represented by the Secretary of the Air Force Filed Dec. 18, 1962, Ser. No. 245,628
4 Claims. (Cl. 235—92)

This invention relates to an electromechanical reader for charts.

One object of the invention is to provide a chart reader which will reduce the time required to analyze the information on the chart.

Another object of the invention is to provide a chart reader which will produce a superior analysis of the chart information.

These and other objects will be more fully understood from the following detailed description taken with the drawing wherein:

FIG. 1 is a perspective view of a chart reader together with its recording registers of the invention;

FIG. 2 is a circuit schematic for the chart reader of the device of FIG. 1;

FIG. 3 is a schematic diagram of the chart readout mechanism of the device of FIG. 1; and FIG. 4 is a schematic diagram of the chart drive and interrupter actuating means for the device of FIG. 1.

Propagation performance of UHF tropospheric communication facilities is customarily measured by a technique which employs the radio transmitter as a signal generator and the radio receiver as part of a transmission measuring set. The fluctuating nature of the medium results in signals which vary over a range of perhaps 50 db as a function of time. To provide a significant measure of performance, it is necessary to collect data over a considerable period of time and base the evaluation on long term summaries of information, for example, 21 days per link has been chosen for the DEW Line. These data are collected by recorders which provide a continuous plot of signal strength versus time.

The significant information upon which any engineering judgment of system performance or recommendations for change would be based is given by two statistical quantities which can be developed by analysis of the charts. The first of these is the median signal, defined as that level of received signal which is exceeded exactly one-half of the time.

The second significant quantity is the "standard deviation," which defines the slope of the curve representing system performance and permits judgment of the system reliability.

Using conventional methods to evaluate the information require approximately 1800 man-hours of effort.

According to this invention, a bank of registers is provided. A stylus, or reading guide member, manipulated by an operator is made to follow the data trace line. The reading guide member is mechanically linked to a rotary switch to vary the number of registers energized at any one time and this acts to integrate the magnitudes of the data information. An interrupter operated by the chart feed and connected in the register circuit provides the time factor in the data information on the registers. A constant current supply is provided in the register circuit to limit the current as the number of registers connected into the circuit is changed.

Referring now to FIG. 1 of the drawing, reference number 51 refers to a chart reading device having a chart reading apparatus 52 and a recording apparatus 53 in which a chart 54 is driven past a reading guide member 55. An operator keeps the line sighting V-notch 56 on the reading guide member aligned with the recorded line 57 on chart 54. Movement of the reading guide member 55 across the chart acts to connect a corresponding number of numerical recording registers 1–50 into the recording circuit as will be described with reference to FIGS. 2–4.

FIG. 2 shows a multiposition switch 58, the position of which is controlled by a chart reading guide member 55 as will be explained later. A plurality of registers, shown as fifty (50) in this case, are connected in series to the positive terminal of a constant current supply 59 with the junctions between the registers being connected to corresponding contacts on switch 58. The registers 1–50, which were used, are a common type of message register with four counting drums which are operated by an electromagnet in which the register is advanced one step for each pulse applied to the electromagnet. The pulses for advancing the registers are provided by interrupter 60 which is actuated by the chart transfer mechanism, as shown schematically in FIG. 4. The interrupter 60 is connected between the negative terminal of the constant current power supply 59 and the wiper contact arm 61 of switch 58. Wiper contact arm 61 is geared to a chart reading guide member 55 by means of gears 62 and 63 as shown schematically in FIG. 3. Since the number of registers and, therefore, the load connected to the power supply, varies over a wide range as switch contact 61 is moved auxiliary power supplies 65 and 66 are provided to share the load.

In the operation of the chart reader, an operator follows the recorded line 57 with the V-notch 56. As the reading guide member is moved across the paper by the operator in following the line, wiper contact arm 61 is moved to connect a number of registers, corresponding to the guide member position, into the circuit. Each time a projection 68 passes switch interrupter 60 as the chart is moved through the chart reading apparatus by chart drive means, shown schematically at 67 in FIG. 4, a pulse is applied to all of the registers in the circuit at that time and each register is thus advanced one position. The chart reader thus acts to integrate the total time that the chart record exceeds the value corresponding to each register.

There is thus provided a device which will reduce the time required for analyzing the information on a chart.

While certain specific embodiments are described in detail, it is obvious that numerous changes may be made without departing from the general principle and scope of the invention.

We claim:

1. A line chart reading device, comprising a plurality of registers, a constant current power supply connected in series with said registers, a line sighting device adapted to move over said chart to follow a line thereon, means for varying the number of registers connected in series with said constant current power in response to the movement of said sighting device across said chart, means for moving said chart past said sighting device, and means responsive to said chart moving means for interrupting said series circuit to thereby supply pulses to said registers to step the registers.

2. A line chart reading device, comprising a plurality of pulse counting registers connected in series, a multicontact switch having a wiper contact and a plurality of stationary contacts thereon, means for connecting the junction of said registers to the stationary contacts on said switch with one contact for each junction, a constant current power supply connected between one end of said series-connected registers and said wiper contact, a current interrupter connected between said power supply and said wiper contact, a line sighting device mechanically coupled to said wiper contact, adapted to move said wiper contact from one of said stationary contacts to another in response to movement of said sighting device, means for moving said chart past said sighting device, and means responsive to said chart moving means for operating said interrupter.

3. A line chart reading device, comprising a plurality of pulse counting registers connected in series; a multi-contact switch having a wiper contact and a plurality of stationary contacts thereon; means for connecting the junction of registers to the stationary contacts on said switch with one contact for each junction; a constant current power supply connected between one end of said series-connected registers and said wiper contact; a current interrupter connected between said power supply and said wiper contact; a chart reading guide member having a V-notch therein; gear means for mechanically coupling said reading guide member to said wiper contact, adapted to move said wiper contact from one of said stationary contacts to another in response to movement of said reading guide member; means for moving said chart past said reading guide member; and means responsive to said chart moving means for operating said interrupter.

4. A line chart reading device, comprising a plurality of pulse counting registers connected in series; a multi-contact switch having a wiper contact and a plurality of stationary contacts thereon; means for connecting the junction of said registers to the stationary contacts on said switch with one contact for each junction; a constant current power supply connected between one end of said series-connected registers and said wiper contact; auxiliary power supply means connected in series with said registers; a current interrupter connected between said power supply and said wiper contact; a chart reading guide member having a V-notch therein; gear means for mechanically coupling said reading guide member to said wiper contact, adapted to move said wiper contact from one of said stationary contacts to another in response to movement of said reading guide member; means for moving said chart past said reading guide member; means responsive to said chart moving means for operating said interrupter; and means on said chart reading guide member for manually moving the reading guide member across the chart to follow a line thereon.

References Cited by the Examiner

UNITED STATES PATENTS

| | | | |
|---|---|---|---|
| 1,903,418 | 3/1933 | Jacobson | 235—92 |
| 2,360,545 | 10/1944 | Bond et al. | 235—92 |
| 2,693,912 | 11/1954 | Beckham | 235—92 |
| 2,704,633 | 3/1955 | Strother | 235—92 |

DARYL W. COOK, *Acting Primary Examiner.*

J. F. MILLER, *Examiner.*